United States Patent [19]

Kaifu et al.

[11] Patent Number: 4,745,488
[45] Date of Patent: May 17, 1988

[54] IMAGE READER

[75] Inventors: Noriyuki Kaifu, Hiratsuka; Shinichi Seito; Hiromi Kodama, both of Atsugi; Katsuhiko Yamada, Hiratsuka, all of Japan

[73] Assignee: Canon Kabushiki Kaisha, Tokyo, Japan

[21] Appl. No.: 5,787

[22] Filed: Jan. 22, 1987

[30] Foreign Application Priority Data

Jan. 27, 1986 [JP] Japan .................... 61-13787

[51] Int. Cl.⁴ .............................................. H04N 1/40
[52] U.S. Cl. ........................... 358/294; 250/214 AG; 358/280
[58] Field of Search ................... 358/294, 280, 213.19, 358/213.15, 213.31; 250/214 C, 214 AG

[56] References Cited

U.S. PATENT DOCUMENTS 4,602,291 7/1986 Temes ............................ 358/213.19
4,673,807 6/1987 Kobayashi ................... 250/214 AG
4,680,644 7/1987 Shirato ................................ 358/294

Primary Examiner—Howard W. Britton
Attorney, Agent, or Firm—Fitzpatrick, Cella, Harper & Scinto

[57] ABSTRACT

An image reader, comprises a plurality of photosensors which photoelectrically convert incident light from an object to be read, a memory for storing, as correction reference data, data corresponding to photoelectric conversion outputs from said photosensors when said object to be read presents a uniform halftone image, and a correction circuit for obtaining uniform photoelectric conversion output levels among said photosensors using the correction reference data.

3 Claims, 4 Drawing Sheets

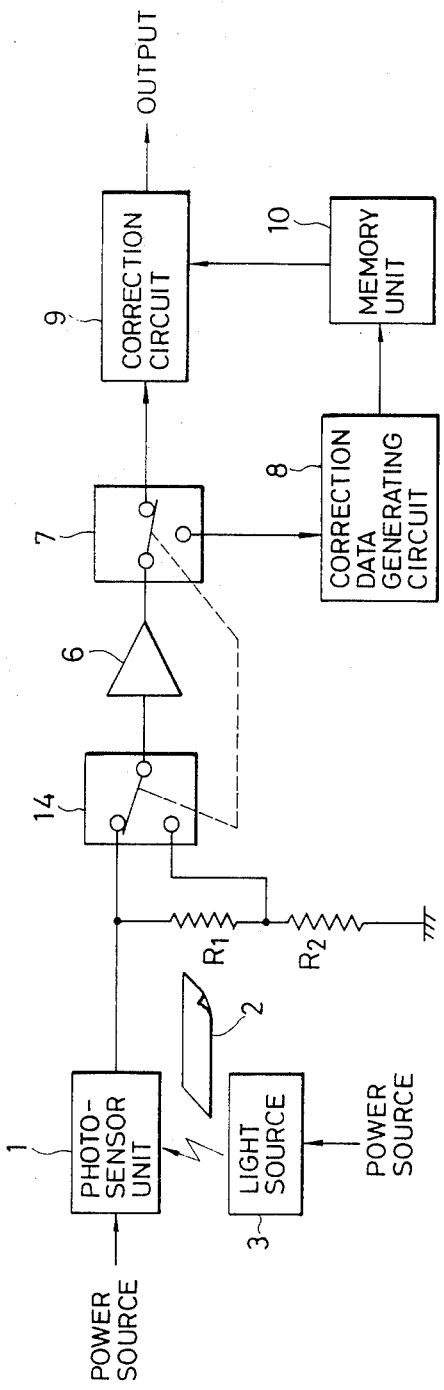

IMAGE READER

BACKGROUND OF THE INVENTION

1. Field of the Invention

The present invention relates to an image reader having a plurality of photosensors and, more particularly, to an image reader having a means for correcting variations in photoelectric conversion outputs from photosensors.

An image reader according to the present invention is widely applied to an image input apparatus such as a facsimile system, a digital copying machine, or the like, and input units for other image processing apparatuses.

2. Related Background Art

In an image reader, an original as an object to be read is irradiated with light, so that reflection light or transmission light becomes incident on a plurality of photosensors so as to be ready by them. Thus, image information of the original is output as an electrical signal.

In this case, photoelectric conversion characteristics of these photosensors slightly vary from each other. As emphasized on the graph in FIG. 4(A), photoelectric conversion outputs from the photosensors vary even with an identical original concentration.

In a conventional image reader, in order to correct the output variations and to obtain an electrical signal accurately corresponding to image information of an original, a reference white original is read, and a photoelectric conversion output is stored as correction reference data. A photoelectric conversion output of a normal original is corrected using the correction reference data, thereby obtaining a uniform output.

However, in the conventional image reading, an original which is approximate to reference white does not cause variations in outputs, and an image of the original can be accurately converted to an electrical signal. However, when an original has a high concentration and a low reflectivity or when an output is attenuated due to a change in temperature or aging, variations in output levels after correction become large, and an electrical signal which precisely corresponds to the image of the original cannot be obtained.

As shown in the graph in FIG. 4(B), since the photoelectric conversion outputs are corrected with reference to the reference white, they can be accurately corrected according to the correction reference data, and output levels among the photosensors are rendered uniform. However, as the concentration of an original becomes high and its reflectivity is decreased or as the outputs are decreased due to a change in temperature or aging, the outputs cannot be accurately corrected by the correction reference data, and variations in output levels among the photosensors become large. For this reason, image reading is inaccurate, and this results in poor reliability.

SUMMARY OF THE INVENTION

An image reader according to the present invention comprises:

a plurality of photosensors which photoelectrically convert incident light from an object to be read;

memory means for storing, as correction reference data, data corresponding to photoelectric conversion outputs from the photosensors when the object to be read presents a uniform halftone image; and correction means for obtaining uniform photoelectric conversion output levels from the photosensors using the correction reference data.

Data corresponding to the photoelectric conversion outputs from the photosensors when the object is a uniform halftone image is used as the correction reference data. Therefore, variations in output levels among the photosensors after correction can be minimized, and an electrical signal accurately corresponding to an image of an object to be read can be obtained.

FIG. 5 is a graph showing the relationship between an original concentration and a photoelectric conversion output which is corrected using the correction reference data according to the present invention.

As shown in FIG. 5, since a photoelectric conversion output corresponding to a halftone original between white and black is used as the correction reference data, variations in corrected output levels with respect to a change in reflectivity of an original, a change in temperature, aging, or the like can be suppressed. Therefore, when the correction reference data is set at an optimal level with respect to an object to be read, as will be described later, reliable image reading can be performed.

BRIEF DESCRIPTION OF THE DRAWINGS

FIG. 3 is a block diagram schematically showing a third embodiment of the present invention;

DETAILED DESCRIPTION OF THE PREFERRED EMBODIMENTS

A preferred embodiment of the present invention will now be described with reference to the accompanying drawings.

Figure 1:
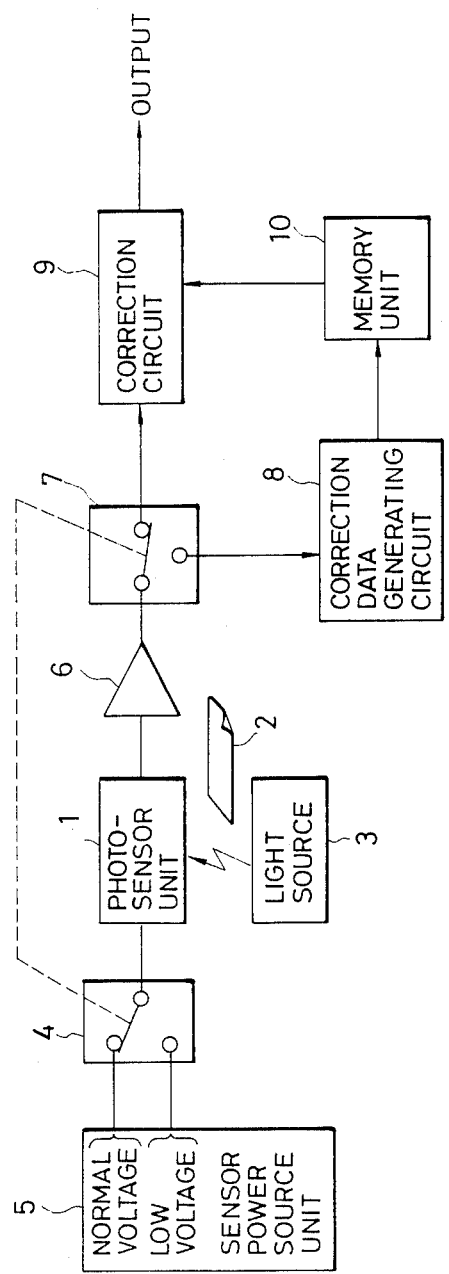
FIG. 1 is a block diagram schematically showing an image reader according to a first embodiment of the present invention.

FIG. 1 is a block diagram schematically showing an image reader according to a first embodiment of the present invention.

Referring to FIG. 1, a plurality of photosensors (e.g., photoelectric conversion type sensors) are one- or two-dimensionally arranged on a photosensor unit 1, so that photoelectric conversion outputs from the respective photosensors are sequentially output by a driver (not shown). Light from a light source (e.g., an LED) 3 becomes incident on the photosensor unit 1 through an original 2 as an object to be read. The incident light need only carry image information of the original 2 in any form, and can be light reflected by the orignal 2 or light transmitted through the original 2.

A drive voltage is applied from a sensor power source unit 5 to the photosensor unit 1 through a switch 4. The sensor power source unit 5 has a normal voltage terminal used in a reading mode and a low voltage terminal of a voltage lower than a normal voltage, which is used in a setting mode for generating correction reference data. The low voltage can be set at a desired value, and is determined in accordance with the level of correction reference data, as described above.

The switch 4 is operated in accordance with the respective modes. Thus, the normal voltage is applied to the photosensor unit 1 in the reading mode and the low voltage is applied to the photosensor unit 1 in the setting mode. Note that FIG. 1 illustrates the state of the reading mode.

Photoelectric conversion outputs from the photosensor unit 1 are amplified by an amplifier 6, and are output to a correction data generating circuit 8 or a correction circuit 9 through a switch 7. The switch 7 is synchronized with the switch 4. The switch 7 outputs the photoelectric conversion outputs amplified by the photosensor unit 1 to the correction circuit 9 in the reading mode, and outputs them to the correction data generating circuit 8 in the setting mode.

In the setting mode, the correction data generating circuit 8 converts the input photoelectric conversion outputs into digital data, and stores the digital data as correction reference data in a programmable/erasable memory unit 10.

In the reading mode, the correction circuit 9 corrects the input photoelectric conversion outputs using the correction reference data stored in the memory unit 10, and outputs the corrected electrical signal.

The operation of this embodiment having the above arrangement will now be described.

Figure 5:
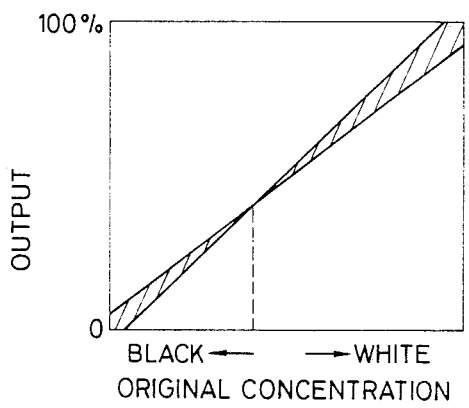
FIG. 5 is a graph showing the relationship between an original concentration and a photoelectric conversion output which is corrected using correction reference data according to the present invention.

A reference white original 2 is set, and the switches 4 and 7 are switched to the setting mode, so that a low voltage is applied from the sensor power source unit 5 to the photosensor unit 1. In this embodiment, since the photoelectric conversion type sensors are used as the photosensors, a photo current is decreased upon a decrease in application voltage. Therefore, a photoelectric conversion output which is equivalent to that obtained when a halftone original is read is input to the correction data generating circuit 8, and is stored in the memory unit 10 as the correction reference data. More specifically, when the low voltage from the sensor power source unit 5 is changed, the correction reference data can be set at a desired halftone level, as shown in FIG. 5.

After the correction reference data is stored in the memory unit 10 in this manner, the original 2 to be input is set, and the switches 4 and 7 are switched to the reading mode, so that a normal voltage is applied to the photosensor unit 1. Thus, image information on the original 2 is read and the photoelectric conversion outputs therefrom are amplified by the amplifier 6 and are then input to the correction circuit 9 through the switch 7.

The correction circuit 9 corrects the input photoelectric conversion outputs using the correction reference data stored in the memory unit 10, and outputs an electrical signal accurately corresponding to the image information on the original 2.

The correction reference data stored in the memory unit 10 can be updated each time the setting mode operation is performed upon changing of a low voltage from the sensor power source unit 5. Therefore, optimal correction reference data can be set in accordance with the state (reflectivity or the like) of the original 2.

Variations caused by offset outputs in the case of a low-reflectivity original can be minimized, and gradation errors of a halftone or dark original can be eliminated.

Figure 2:
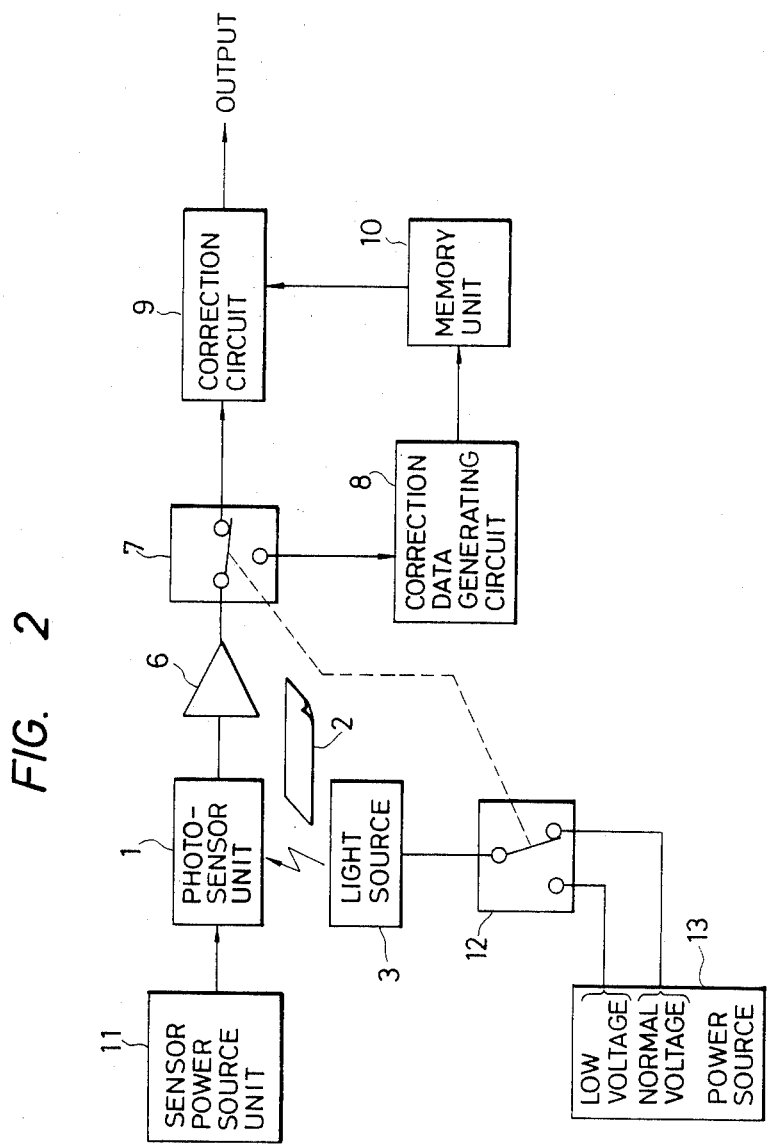
FIG. 2 is a block diagram schematically showing a second embodiment of the present invention.
Figure 4A:
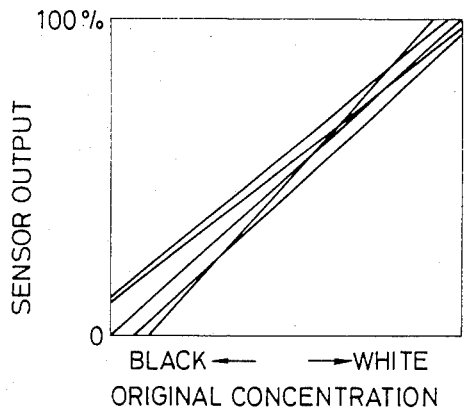
FIG. 4(A) is a graph showing variations in photoelectric conversion characteristics among photosensors.
Figure 4B:
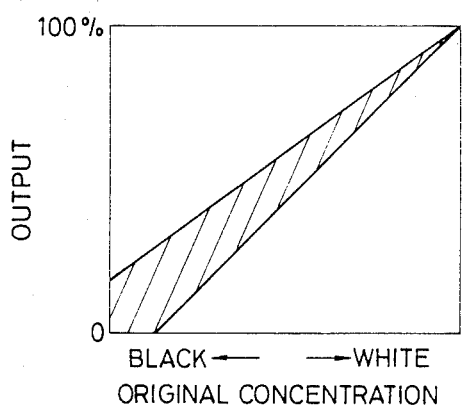
FIG. 4(B) is a graph showing the relationship between an original concentration and a photoelectric conversion output which is corrected using correction reference data with reference to a white original in a conventional image reader.

FIG. 2 is a block diagram schematically showing a second embodiment of the present invention. Note that the same reference numerals in this embodiment denote the same parts as in the first embodiment, and a detailed description thereof will be omitted.

A plurality of photosensors of a desired type are aligned on a photosensor unit 1, and a constant voltage for image reading is applied from a sensor power source unit 11 to the photosensor unit 1.

A normal or low voltage is applied from a power source 13 to a light source 3 through a switch 12. The switch 12 is synchronized with a switch 7, so that a normal voltage is applied to the light source 3 in the reading mode and a low voltage is applied thereto in the setting mode. More specifically, when the normal voltage is applied from the power source 13 to the light source 3, an illuminance necessary for the reading operation of an original 2 can be obtained. When the low voltage is applied from the power source 13 to the light source 3, an illuminance lower than that in the reading mode can be obtained. The light source 3 can comprise a light source, e.g., an LED, whose amount of light can be controlled.

In this embodiment having the above arrangement, a reference white original 2 is set, and the switches 12 and 7 are switched to the setting mode, so that the low voltage is applied from the power source 13 to the light source 3. Thus, since the light source 3 illuminates the reference white original 2 at a low illuminance, photoelectric conversion outputs equivalent to those when a halftone original is read are input to a correction data generating circuit 8, and are stored in a memory unit 10 as correction reference data. More specifically, when the low voltage from the power source 13 is changed, the correction reference data can be set at a desired halftone level.

After the correction reference data is stored in this manner, the reading mode operation is performed in the same manner as in the first embodiment.

FIG. 3 is a block diagram schematically showing a third embodiment of the present invention.

In this embodiment, a constant voltage in a reading mode operation is applied to a photosensor unit 1 and a light source 3.

Photoelectric conversion outputs from the photosensor unit 1 are output to an amplifier 6 through a switch 14. Meanwhile, the outputs are divided by series-connected resistors R1 and R2, and the voltage-divided outputs are also output to the amplifier 6 through the switch 14. The switch 14 is synchronized with a switch 7, so that photoelectric conversion outputs are output to a correction circuit 9 in the scanning mode, and photoelectric conversion outputs which are voltage-divided by the resistors R1 and R2 are output to a correction data generating circuit 8.

In this embodiment having the above arrangement, a reference white original 2 is set, and the switches 14 and 7 are switched to the setting mode. Thus, the voltage-divided photoelectric conversion outputs, i.e., photoelectric conversion outputs equivalent to those when a halftone original is read are input to the correction data generating circuit 8, and are then stored in a memeory circuit 10 as correction reference data. Therefore, when the resistances of the resistors R1 and R2 are changed, the correction reference data can be set at a desired halftone level, as shown in FIG. 5.

After the correction reference data is stored as described above, the reading mode operation is performed in the same manner as in the first embodiment.

As described above, in the image reader according to the above embodiments, data corresponding to photoelectric conversion outputs from the photosensors when an object to be read is a uniform holftone image is used as correction reference data, so that variations in output levels among the photosensors after correction can be suppressed, and an electrical signal accurately corresponding to an image of the object can be obtained. For this reason, even if the object has a low reflectivity, or outputs are decreased due to a change in temperature or aging, a reliable image reading operation can be performed.

What is claimed is:

1. An image reader, comprising:

a plurality of photosensors which photoelectrically convert incident light from an object to be read;

memory means for storing, as correction reference data, data corresponding to photoelectric conversion outputs from said photosensors when the object to be read presents a uniform halftone image; and correction means for obtaining uniform photoelectric conversion output levels among said photosensors using the correction reference data.

2. An image reader according to claim 1, wherein the correction reference data is obtained such that illuminance of light radiated on a white object to be read is decreased to be lower than that in a reading mode.

3. An image reader according to claim 1, wherein the correction reference data is obtained such that reflected incident light from a white object to be read is photoelectrically converted while a drive voltage for said photosensors is decreased.

* * * * *